(12) United States Patent
Kariya et al.

(10) Patent No.: US 12,153,528 B2
(45) Date of Patent: Nov. 26, 2024

(54) FRAGMENTED PERIODIC TIMING CALIBRATION

(71) Applicant: Cadence Design Systems, Inc., San Jose, CA (US)

(72) Inventors: Kartik Dayalal Kariya, Bangalore (IN); Sreeja Menon, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/892,262

(22) Filed: Aug. 22, 2022

(65) Prior Publication Data

US 2023/0267082 A1 Aug. 24, 2023

Related U.S. Application Data

(63) Continuation of application No. 16/934,008, filed on Jul. 21, 2020, now Pat. No. 11,449,439.

(60) Provisional application No. 62/878,657, filed on Jul. 25, 2019.

(51) Int. Cl.
G06F 13/16 (2006.01)
(52) U.S. Cl.
CPC ............................... G06F 13/1668 (2013.01)
(58) Field of Classification Search
CPC .................................................. G06F 13/1668
See application file for complete search history.

(56) References Cited

U.S. PATENT DOCUMENTS

| | | |
|---|---|---|
| 6,188,626 B1 | 2/2001 | Chang |
| 6,853,938 B2 | 2/2005 | Jeddeloh |
| 6,920,540 B2 | 7/2005 | Hampel et al. |
| 7,042,785 B2 | 5/2006 | Kim |
| 7,342,841 B2 | 3/2008 | Jain et al. |
| 7,356,642 B2 | 4/2008 | Bellows et al. |
| 7,668,698 B2 | 2/2010 | Jiang |
| 7,894,282 B2 | 2/2011 | Pyo et al. |
| 8,037,375 B2 | 10/2011 | Schaefer |
| 8,120,965 B2 | 2/2012 | Yang |
| 8,347,027 B2 | 1/2013 | Gray et al. |
| 8,407,441 B2 | 3/2013 | Giovannini et al. |
| 8,437,216 B2 | 5/2013 | Oh et al. |
| 8,605,539 B2 | 12/2013 | Haldar et al. |
| 9,086,881 B2 | 7/2015 | Liu et al. |
| 9,111,632 B2 | 8/2015 | Sato et al. |
| 9,164,933 B2 | 10/2015 | Zerbe et al. |
| 9,218,575 B2 | 12/2015 | Mozak et al. |
| 9,355,708 B2 | 5/2016 | Yu et al. |
| 9,558,850 B1 | 1/2017 | Bialas, Jr. et al. |

(Continued)

OTHER PUBLICATIONS

JEDEC Standard, "Graphics Double Data Rate (GDDR6) SGRAM Standard", Jul. 2017 JEDEC Standard No. 250. 190 pages.

(Continued)

*Primary Examiner* — Michael Krofcheck
*Assistant Examiner* — Janice M. Girouard
(74) *Attorney, Agent, or Firm* — Mark H. Whittenberger; Holland & Knight LLP (57) ABSTRACT

Periodic signal timing calibration is implemented in time-distributed fragments executed concurrently with occasional system-idling maintenance operations to maintain reliable synchronous communication between interconnected system components without impacting system availability.

18 Claims, 4 Drawing Sheets

(56) References Cited

U.S. PATENT DOCUMENTS

| | | |
|---|---|---|
| 9,570,145 B2 | 2/2017 | Ware et al. |
| 9,639,495 B2 | 5/2017 | Dearth et al. |
| 9,715,907 B1 | 7/2017 | Rao et al. |
| 9,933,960 B2 | 4/2018 | Ware et al. |
| 10,067,689 B1 | 9/2018 | Ying et al. |
| 10,545,866 B1* | 1/2020 | Kato .................... G11C 29/028 |
| 2010/0005281 A1* | 1/2010 | Buchmann .......... G06F 13/4243 |
| | | 713/2 |
| 2011/0264849 A1 | 10/2011 | Ware et al. |
| 2015/0066819 A1 | 3/2015 | Mozak et al. |
| 2015/0221354 A1* | 8/2015 | Palmer .................... G11C 7/22 |
| | | 365/194 |

OTHER PUBLICATIONS

JEDEC Standard, "Low Power Double Data Rate 4 (LPDDR4)" Nov. 2015, JEDEC Standard No. 209-4A. 272 pages.

* cited by examiner

FIG. 1

FIG. 2 Opportunistic Timing Calibration

FRAGMENTED PERIODIC TIMING CALIBRATION

CROSS REFERENCE TO RELATED APPLICATIONS

This application is a continuation of U.S. patent application Ser. No. 16/934,008 filed Jul. 21, 2020 (U.S. Pat. No. 11,449,439), which claims the benefit of U.S. Provisional Application No. 62/878,657 filed Jul. 25, 2019. Each of the foregoing applications is hereby incorporated by reference.

TECHNICAL FIELD

The present disclosure relates to synchronous chip-to-chip signaling.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments disclosed herein periodic signal timing calibration is implemented in time-distributed fragments executed concurrently with occasional system-idling maintenance operations, thus maintaining reliable synchronous communication between interconnected system components without impacting system availability. In a number of embodiments detailed below, fragmented periodic timing calibration is implemented within a memory system that requires periodic memory refresh and/or other system maintenance events, hiding individual timing calibration fragments under the time allocated for such maintenance events. In all cases, the techniques and circuitry disclosed herein may be more broadly applied within any chip-to-chip signaling system that requires periodic traffic-halting maintenance events.

Figure 1:
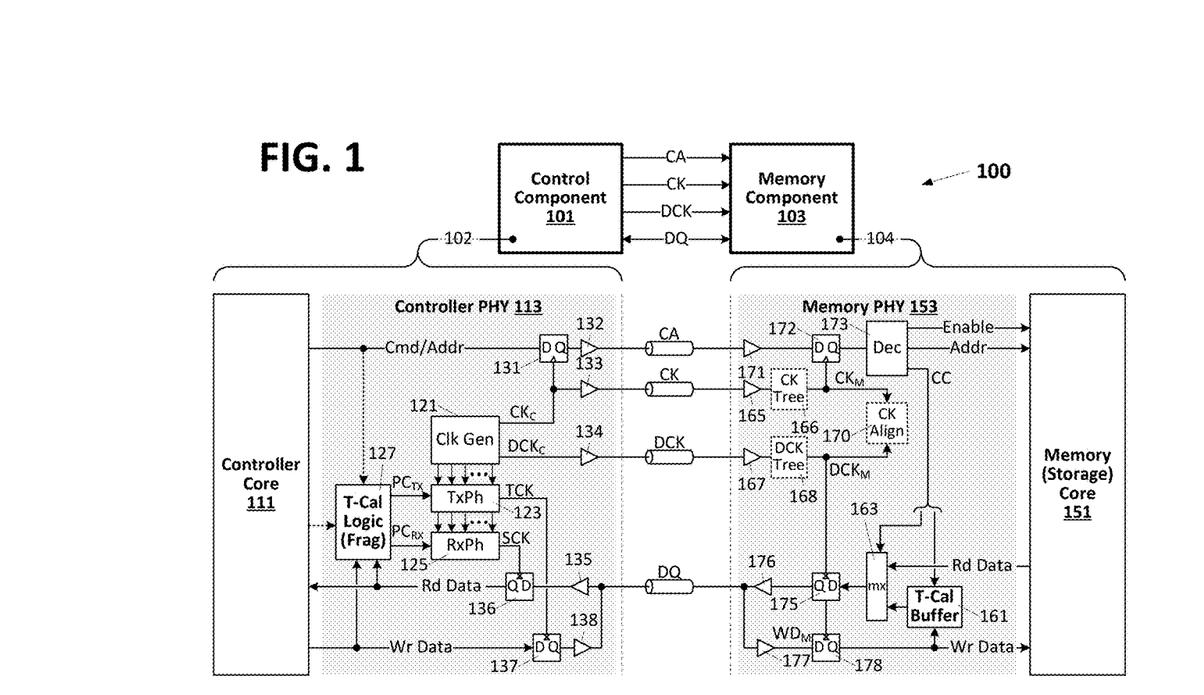
FIG. 1 illustrates an embodiment of a synchronous memory system that implements fragmented periodic timing calibration.

FIG. 1 illustrates an embodiment of a synchronous memory system 100 that implements fragmented periodic timing calibration. As shown, memory system 100 includes a control component 101 that issues memory read and write commands and address values to a memory component 103 via one or more command/address links (CA) and that receives corresponding read data from the memory component (and transmits corresponding write data to the memory component) via one or more data links (DQ). The control component forwards a system clock signal to the memory component via system clock link (CK) to establish a timing domain within the memory component for synchronized sampling of incoming command/address values and operation of the memory core. In the depicted embodiment, the data signaling rate exceeds the command signaling rate so that the control component forwards another clock signal—referred to herein as a data clock signal (DCK)—to the memory component to supply timing edges for high-speed data reception and transmission (sampling write data, outputting read data). In other embodiments, the system clock may supply the timing edges for data reception and/or transmission (so that no separate data clock need be forwarded).

Still referring to FIG. 1 and more specifically to detail view 102, control component 101 includes a controller core 111 and a physical signal interface (controller PHY) 113, the former to receive and respond to memory access requests from a host (i.e., via a host-interface such as an AMBA bus (advanced microcontroller bus architecture), not shown) by issuing command/address values to the PHY for transmission to memory component 103 (i.e., over the CA link(s)) and by forwarding host-supplied write data to the PHY (for transmission to the memory component) and returning read data from the PHY to the host. Controller core 111 also includes logic to initialize and schedule maintenance operations within the memory component and/or controller component, issuing commands to the memory component (or internal circuit components) as necessary to refresh stored data (e.g., within a memory component having a dynamic random access memory (DRAM) core or any other type of storage technology that requires occasional data re-storage), calibrate signal driver strength, calibrate on-die termination impedances, calibrate relative phasing of the system and data clocks (e.g., to achieve timing-domain alignment within the memory component), calibrate local instances of the data clock used to time write data transmission and read data sampling, etc.

In the depicted embodiment, controller PHY 113 includes a clock generator 121 to generate internal instances of the system clock signal ($CK_C$) and data clock signal ($DCK_C$) together with a transmit phase generator 123 and receive phase generator 125 to generate respective mesochronous instances of the data clock signal, referred to herein as a transmit clock (TCK) and sampling clock (SCK)—clock signals phase offset from $DCK_C$ as necessary to achieve desired/optimized write-data sample timing within memory component 103 and a desired/optimized read-data sample timing within controller component 101. A timing-calibration logic circuit 127 is provided to initialize and periodically update the phases of the transmit and sampling clocks and more specifically to provide and adjust transmit-clock and sampling-clock phase codes ($PC_{TX}$, $PC_{RX}$) during time-distributed component operations (fragments) of a periodic timing calibration, storing information associated with each fragment operation to enable eventual clock phase update at the conclusion of a complete periodic timing calibration (i.e., an operation collectively implemented by multiple fragment timing calibration operations).

Continuing with detail view 102 of control component 101, a command/address transmit circuit (edge-timed flop stage 131 and output driver 132) outputs command/address values (supplied from a transaction queue or other command/address buffer within controller core 111) to memory component 103 via the CA link(s) in response to transitions of the internal system clock ($CK_C$), and output drivers 133 and 134 transmit the system clock and data clock to the memory component (i.e., CK being a transmitted instance of $CK_C$ and DCK being a transmitted instance of $DCK_C$) via the system clock and data clock links. A data signal receiver formed by buffer-amplifier 135 and flop stage 136 receives inbound read data (or any signals transmitted by the memory component via the DQ links) in response to edges of the sampling clock signal, and a data signal transmitter formed by flop stage 137 and driver 138 outputs write data to the memory component synchronously with respect to edges of the transmit clock. In the particular embodiment shown, flop stages 136 and 137 latch data in response to both rising and falling clock edges (i.e., rising and falling transitions of the sampling clock and transmit clock, respectively, or rising edges (or falling edges) of both true and complement clock instances when the sampling clock and/or transmit clock are implemented differentially) such that data is transmitted/received at twice the data clock (and sampling clock and transmit clock) cycle rate in a double-data rate transmission. In alternative embodiments, additional transmit/receive clock edges (e.g., within phase-staggered instances of the transmit and receive clocks) may be used to implement quad-data rate signaling (four bits per data clock cycle), octal data rate signaling (eight-bits per data clock cycle) or any other practicable number of bits per data clock cycle. Also, though shown in singularity, flop-stages 136, 137 and the "DQ" link should be understood to represent a data path of any practicable width (i.e., flop stages 136 and 137 represent N single-bit flop stages coupled to N parallel DQ links, where N is any nonzero integer value). Similarly, while single instances of the sampling and transmit clock signals are described in connection with fragmented timing calibration herein, each clock may be generated in multiple instances each having an independently controlled phase to permit per-bit or per-bit-group timing calibration. Further, while not specifically shown, additional data signaling links may be provided between the memory component and control component including, for example and without limitation, side-band links (e.g., for low-speed side-channel communication), one or more links to convey masking information, data-inversion information, error correction information, etc. with any such information conveyed on a dedicated link or multiplexed with other information on a shared link. Transmit and receive circuits within control component 101 and memory component 103 for any or all of such other links may be clocked by the transmit and sampling clocks, respectively (or independently controlled transmit and receive clock instances), so that, for purposes of discussion herein, such other links are deemed to be data link instances (i.e., all calibration operations with respect to DQ link signal conveyance may be extended to such other links).

Referring now to detail view 104, memory component 103 includes a storage core 151, and physical signaling interface (PHY) 153, the latter including signal reception and transmission circuitry corresponding to the signal transmission and reception counterparts within controller PHY 113, together with a timing-calibration storage buffer 161 and read-out multiplexer 163. Buffer-amplifiers 165 and 167 receive the system clock signal and data clock signal from links CK and DCK, respectively, outputting amplified/conditioned (e.g., level-converted) instances of those timing signals to downstream circuitry. In cases where the system clock and/or data clock are to be fanned out to multiple loads (i.e., clocking inputs of numerous other circuit blocks), clock trees (166, 168) or the like may be provided to generate multiple phase-aligned instances of the internal system clock ($CK_M$) and/or internal data clock ($DCK_M$)—an arrangement that generally adds, on top of the relatively static link-propagation delay, an arbitrary (and, unless compensated, time-drifting) phase delay between the memory-internal instance of a given clock and controller-internal instance of that same clock. Optional alignment circuitry 170 may be provided to enable controller-side (i.e., within control component 101) phase adjustment of the system clock and/or data clock so as to establish a desired timing alignment within the memory component—for example, phase alignment of memory-internal instances of the system clock and data clock ($CK_M$, $DCK_M$) to establish a unified timing domain within the memory component. In that case, the alignment circuitry (e.g., one clock sampling the other to provide phasing information) may output information indicating relative phases of $CK_M$ and $DCK_M$ to the control component (i.e., to enable the above-described clock phase adjustment) via a data link, or any other practicable return data path (e.g., link used convey error data correction information (EDC), status information, etc.) to enable phase adjust circuitry in the control component to shift phases of the system clock and/or data clock.

Continuing with detail view 104, a buffer-amplifier 171 receives inbound command/address signals from the CA link and forwards amplified (or otherwise conditioned instances) of those signals to flop-stage 172 to be sampled in response to $CK_M$ edges. The sampled command/address values are delivered in turn to decoder 173 (i.e., control circuitry) which, in the case of memory access commands, responsively outputs access control signals (e.g., enable signals) and address signals to memory core 151 to execute the commanded memory access operation. In the cases of a memory read command or memory write command, for example, decoder 173 outputs enable signals and address signals to the memory core as necessary to retrieve read data therefrom or store data therein, respectively—multi-command/multi-stage operations in the case of DRAM, with a page of data first being transferred from an addressed bank and row of storage cells to a page buffer (sense-amp array) within the core in response to an activation command, followed by core-output of a column of data from the page buffer in response to a subsequent column-read command or overwrite of a column of data within the page buffer in response to a column-write command. Other command protocols may apply with respect to other types of core storage technologies (e.g., programming and read-out command sequences in the case of a Flash memory core). In any case, read data from memory core 151 is conveyed to a data transmitter—flop stage 175 and signal driver 176—via multiplexer 163, and write data is conveyed to memory core 151 via a data receiver implemented by buffer-amplifier 177 and flop stage 178.

Still referring to FIG. 1, decoder 173 responds to command/address values that signal maintenance operations (e.g., refresh of some or all storage banks within the memory core, drive-strength calibration, on-die termination calibration, timing calibration, etc.) or register programming operations (e.g., storing configuration data in one or more mode registers or other programmable circuits not specifically shown), by outputting control signals to memory core 151 or other circuit blocks as necessary to complete the commanded operation. In the specific case of periodic timing calibration, controller core 111 (and/or timing-calibration logic 127) issues commands via the CA link instructing storage of training data within timing-calibration buffer 161 (e.g., training data that matches or otherwise corresponds to data stored or generable within controller-side timing-calibration logic 127) as well as commands instructing training-data readout. In one embodiment, control component 101 supplies training data to memory component 103 (for storage within the timing-calibration buffer) via the command/address path or side-band signaling channel data prior to initial write-data timing calibration, and thereafter conveys training data either via the command/address path or via the data path (DQ). In any case, decoder 173 responds to an incoming read-timing calibration command by asserting calibration control signals (CC) that enable training data output from timing-calibration buffer 161 (e.g., in a multi-cycle burst from respective burst positions within one or more storage stages of the timing-calibration buffer) to the read data transmitter (175, 176) via multiplexer 163. In a write-timing calibration, control component 101 issues one or more write-timing calibration commands together with write data to be stored within timing calibration buffer 161. Decoder 171 responds to incoming write-timing calibration commands by issuing calibration timing signals that enable write data sampled within flop stage 178 to be loaded into timing-calibration buffer 161 (e.g., loading one or more or all of the stages of the buffer with the sampled write data burst).

Figure 2:
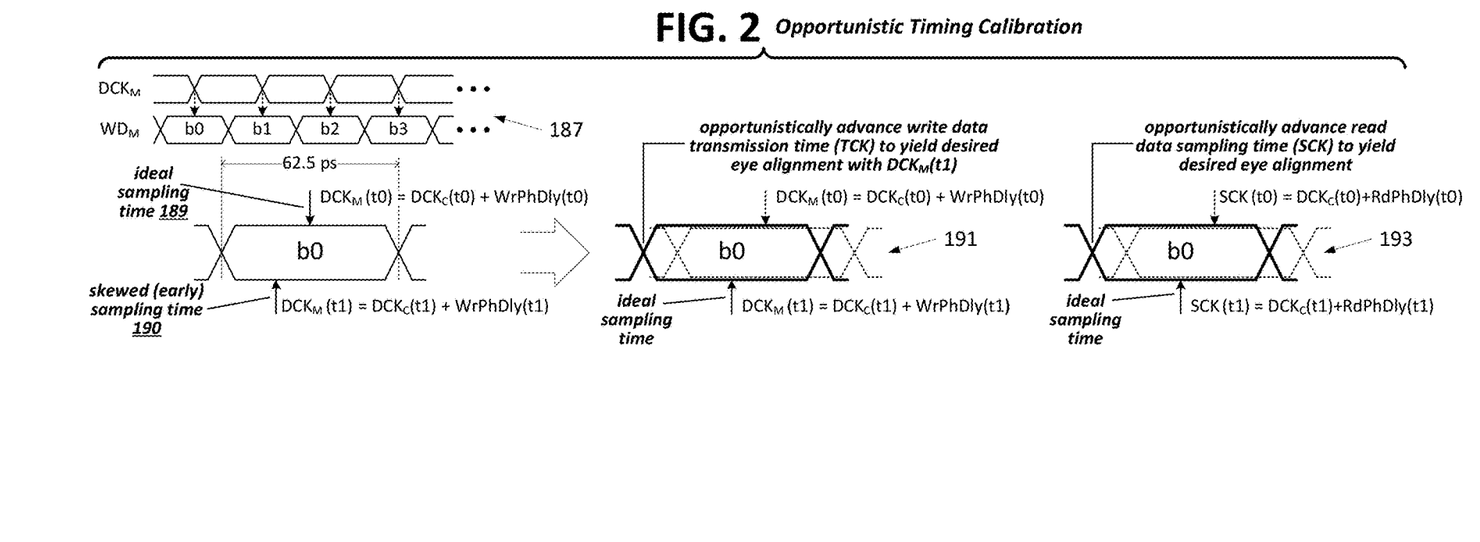
FIG. 2 illustrates an exemplary timing relationship between the memory-side and control side sampling clock signals and sampled data, showing an example of opportunistic timing calibration that may be implemented within the embodiment of FIG. 1.

FIG. 2 illustrates an exemplary timing relationship between the memory-side and control side sampling clock signals ($DCK_M$ and SCK, respectively) and sampled data, showing the general opportunistic timing calibration approach (i.e., executing periodic timing calibration opportunistically during time-distributed maintenance operations required within the memory component and/or memory system) employed to maintain signaling integrity despite time-varying delays between controller-side and memory-side timing signals (e.g., due to voltage and/or temperature drift).

Referring first to memory-side receive timing calibration (i.e., write timing calibration), the write data clock applied to sample incoming write data, $DCK_M$, has an arbitrary phase delay relative to the control-side instance of that same clock according to the clock propagation time through signal driver 134, over the DCK link, through buffer-amplifier 167 and then through clock tree 168 (if provided)—delays collectively referred to as the write-phase delay (WrPhDly). Assuming an initially ideal alignment of $DCK_M$ and incoming write data at time t0 (e.g., with the $DCK_M$ sampling edges aligned with respective data-eye midpoints as shown in the double-data rate example at 187 and ideal sampling time at 189) followed by uncompensated timing drift during the time interval from t0 to t0 (e.g., write phase delay is reduced due to voltage/temperature change and/or the control side transmit time drifts to a more delayed timing point relative to $DCK_M$), yields, from the perspective of the control component, the skewed t1 sampling edge shown at 190, reducing signaling margin and thus increasing error likelihood. For example, jitter in the control-side transmit clock/memory-side sampling clock ($DCK_M$) and/or skewed data eye opening or closing (the depicted data eye is idealized) may result in sampling beyond the data valid interval or at a time when the data signal level is within a metastable range. Moreover, a 16 Gbps data rate (and 8 GHz differential sampling clock) is assumed in the example shown, leaving a scant 62.5 picosecond (ps) data eye, so that even small temperature and/or voltage changes that may occur within a few seconds or less may yield significant timing skew.

In the system of FIG. 1, timing calibration is implemented by phase-adjusting control-side transmit and receive clocks so that, in the case of write-data sample timing within memory component 103, the phase of the control-side transmit clock (TCK) is advanced or delayed as necessary to shift the data waveform timing relative to the memory-side data clock ($DCK_M$). Thus, as shown at 191, control component 101 advances the phase of the write-data transmit clock (TCK) to shift the data arrival time at the memory component at an earlier time—specifically to a time that yields mid-point alignment with $DCK_M$. To calibrate read-data sample timing (within the control component), control component 101 delays or advances the phase of the local sampling clock (SCK) to effect midpoint alignment with the incoming read data waveform as shown at 193, compensating for changes in the read phase delay from time t0 to t1. As explained below, during system start-up or reset a relatively extensive and time-consuming timing calibration is executed to initialize the phases of the control-side transmit and receive clocks to desired timing points. Thereafter, to avoid impacting system availability (i.e., blocking or otherwise limiting data signaling bandwidth for host read and write traffic), control component 101 opportunistically executes periodic timing calibration—for example, concurrently with mandatory traffic-blocking maintenance operations, such as occasional refresh to all storage banks within the memory core—to maintain the desired timing alignment. In a number of embodiments, such traffic-blocking maintenance operations are exceedingly brief, with time allotted (specified or budgeted) for an individual maintenance operation being insufficient to determine a phase update for even one of the transmit and receive clocks. In those cases, the periodic timing calibration operation is decomposed into fragment (component) operations that are executed during respective maintenance operations, effectively distributing the periodic timing calibration over a disjointed (discontiguous) sequence of time intervals to avoid system unavailability beyond that required for the maintenance operations themselves.

Figure 3:
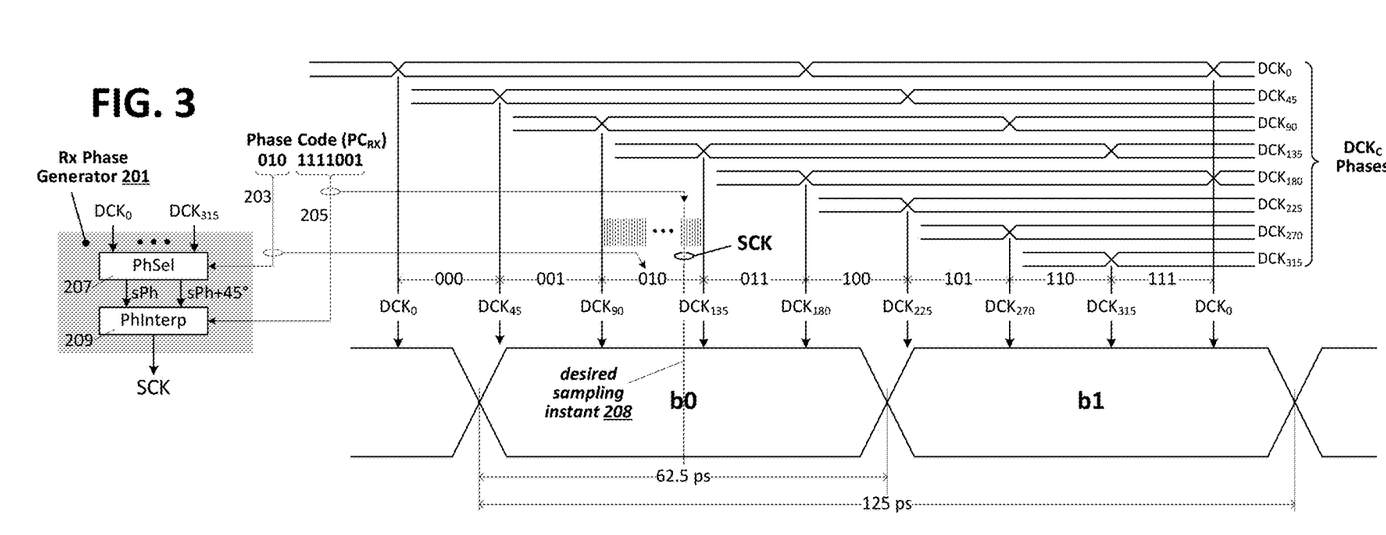
FIG. 3 illustrates an embodiment of a receive phase generator together with waveform diagrams explaining its operation in the context of receive-timing phase adjustment.
Figure 4:
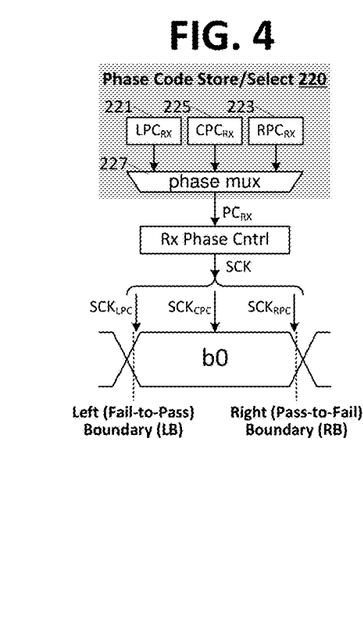
FIG. 4 illustrates exemplary phase-code storage and selection circuitry that may be implemented within the timing-calibration logic of FIG. 1 to support fragmented periodic timing calibration.

FIGS. 3 and 4 illustrate embodiments of functional elements/circuitry implemented within a control component (e.g., control component 101 of FIG. 1) to enable fragmented periodic timing calibration. More specifically, FIG. 3 illustrates an embodiment of a receive phase generator 201 (i.e., that may be used to implement phase generator 125 of FIG. 1) together with waveform diagrams explaining its operation in the context of receive-timing phase adjustment. Continuing with the 16 Gbps data rate, 8 GHz data clock rate shown in FIG. 2 (exemplary data and clock rates carried forward in various examples herein—in all cases, different data and clock rates may apply, including different data-rate/clock-rate ratios as in the case of quad data rate signaling, octal data rate signaling, etc.), receive-clock phase generator 201 receives (e.g., from a clock generator as shown at 121 in FIG. 1) a set of phase-staggered instances of the data clock signal that span, in 45° phase steps, a full data clock cycle (125 ps) and thus two 62.5 ps data bit times (2*tbit). A phase code supplied to the receive side phase generator—e.g., $PC_{RX}$ as shown in FIG. 1—includes a phase-selection bit field and an interpolation bit field containing digital phase-select and interpolation values (203, 205), respectively. As shown, phase-select value 203 is supplied to a phase selector 207 to select one of the eight phase-adjacent pairs of data clock phases (in this case phases DCK90 and DCK135 which bound a desired sampling point 208) while interpolation value 205 is supplied to a phase interpolator 209 (or phase mixer) to effect a weighted mixing of the selected pair of clock phases and thus generation of a clock phase (the sampling clock, SCK) having any of $2^N$ phase offsets from the bounding clock phases (where N is the bit-depth of the interpolation bit field). In the specific example shown, three bits are allocated to the phase-selection bit field (more or fewer bits may be allocated in examples having more or fewer input clock phases, including zero bits where only two clock phases are available to be mixed/interpolated) and seven bits are allocated to the interpolation bit field, thus enabling generation of a sampling clock signal having any of 128 phase offsets within any of eight data clock phases—i.e., $2^{10}$ or 1024 different phase offsets within the data clock cycle time, with a 0.122 ps step between adjacent phases (i.e., 125 picosecond clock cycle time divided by 1024 phase offsets). More or less resolute phase steps may be implemented in alternative embodiments.

FIG. 4 illustrates exemplary phase-code storage and selection circuitry 220 that may be implemented within the timing-calibration logic of FIG. 1 (i.e., element 127 within control component 101) to support fragmented periodic timing calibration. More specifically, phase code registers 221 and 223 are loaded with phase codes corresponding to sample-failure boundaries (where an incorrect data state is sampled) at the leading and trailing edges of the data eye—referred to herein as the left boundary (or fail-to-pass boundary stepping from left to right) and right boundary (or pass-to-fail boundary), respectively. Phase code register 225 stores a center phase code corresponding to the mid-phase between the left and right sample-failure boundaries, and multiplexer 227 enables run-time selection between the three phase codes, thus enabling the sampling clock signal to be rapidly (immediately) phase-shifted to the left boundary ($SCK_{LPC}$), right boundary ($SCK_{RPC}$) or center phase ($SCK_{CPC}$, the operational phase applied to sample host-requested read data), a capability leveraged to support fragmented periodic timing calibration as explained below.

Figure 5:
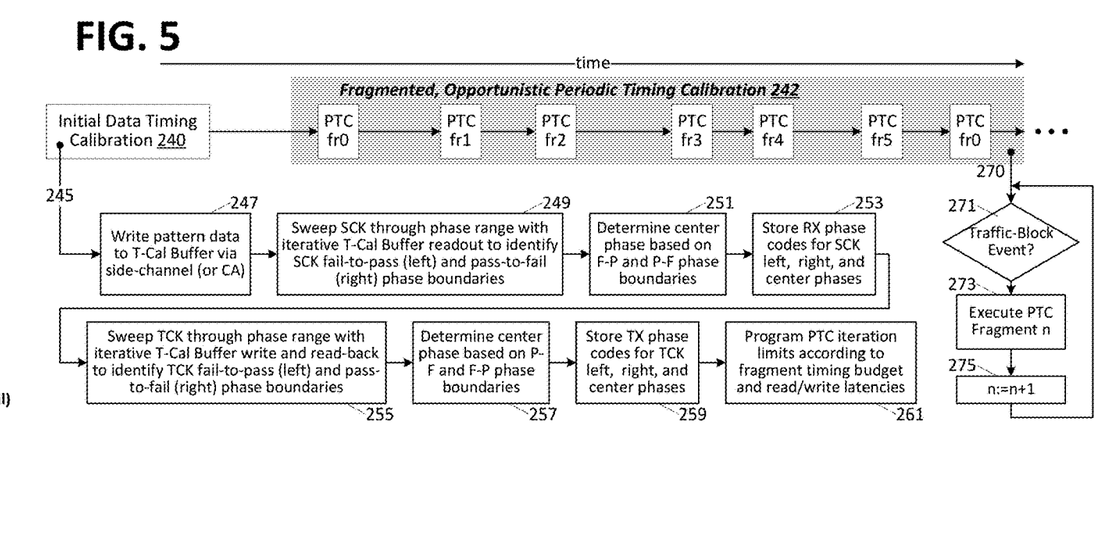
FIG. 5 illustrates an exemplary calibration timeline, showing an initial data calibration followed by opportunistic periodic timing calibration executed in discontiguous (time-distributed) fragment operations.

FIG. 5 illustrates an exemplary calibration timeline, showing an initial data calibration at 240 (e.g., following system startup or reset) followed by opportunistic periodic timing calibration executed in discontiguous (time-distributed) fragment operations shown generally at 242 (i.e., PTC fragments fr0, fr1, fr2, . . . ). In a number of embodiments, the initial timing calibration (240) not only establishes the initial receive and transmit clock phases needed for high-speed synchronous data transfer, but also stores training data and left/right boundary phase codes that enable fragmented periodic timing calibration thereafter. In a more detailed initial calibration sequence shown in detail view 245, for example, the control component writes training data to the timing-calibration buffer via a previously timing-calibrated command/address path or via a low-speed side channel (i.e., as write data timing has not yet been established) as shown at 247, and thereafter sweeps the sample clock through the available phase range while iteratively instructing the memory component to transmit the training-data content of the timing calibration buffer as shown at 249 (e.g., issuing specialized buffer-read command to memory component as discussed above). By comparing the sampled training data with expected data (e.g., training-data copy maintained or generated within the controller-side timing calibration logic) at each sample-clock phase, the control component identifies the left and right sample-failure boundaries (fail-to-pass and pass-to-fail boundaries) also shown at 249 and then uses those boundaries at 251 to determine the center (mid-point) sampling clock phase. If not already stored as part of the operations at 249 and/or 251, the control component stores the phase codes corresponding to the left and right sample-failure boundaries (e.g., last non-failing phase at either edge) and the phase code corresponding to the mid-point phase within respective left, right and center phase code registers (e.g., registers 221, 223 and 225 in FIG. 4).

Continuing with the initial data timing calibration in detail 245, the control component sweeps the transmit clock through the available phase range at 255, writing training data to the memory component (for storage within the timing calibration buffer) and reading the training data back at each phase point to assess pass/fail status for the specific transmit clock phase (note that the training-data write and read-back may be executed iteratively for each transmit clock phase—likewise for data readback per sampling clock phase). At 257, the control component determines the center (mid-point) transmit clock phase to be applied during host data write based on the fail-to-pass and pass-to-fail boundaries determined at 255 and, if not already completed in operations 255 and 257, the control component loads the transmit-clock phase codes for left, right and center phases into respective registers within the timing-calibration logic at 259 (i.e., loading into instances of registers generally as shown in FIG. 4, but provided to output a multiplexer-selected transmit phase code ($PC_{TX}$) to the transmit phase controller). At 261, the control component programs loop iteration limits to be applied during periodic timing calibration—limits that, as discussed below, may vary according to the time required (latency imposed) to execute a training-data read and/or write during a single iteration of a periodic timing calibration fragment and according to the timing budget allocated to the maintenance operation under which the calibration fragment execution is to be hidden.

Still referring to FIG. 5, timing calibration logic within the control component (e.g. logic 127 in FIG. 1) executes periodic-timing-calibration fragments one after another (sequentially) as shown at 242. Referring to fragment-execution loop 270, for example, upon detecting or being notified of a traffic-blocking event at 271 (e.g., by snooping command/address traffic, receiving an update notification per protocol, etc.) such as a mandatory refresh to all banks or other operation that requires host read/write data halt for a duration sufficient to complete a timing calibration fragment, the timing calibration logic executes a periodic timing calibration fragment at 273, advancing the fragment index ('n') at 275 to make ready for execution of another periodic timing-calibration fragment during a subsequent traffic-blocking event. In systems where the frequency of traffic blocking events outpaces the requisite periodic timing calibration completion interval (e.g., more than enough time to complete all fragments of a periodic timing calibration), fragment execution may be skipped during selected events as necessary to reduce power consumption. Conversely, where the frequency and/or duration of traffic-blocking events provides insufficient time to complete all fragments of a periodic timing calibration within a specified time limit, traffic-blocking may be extended with respect to one or more maintenance operations (and/or one or more traffic-blocking time intervals may be dedicated to execution of one or more periodic timing calibration fragments) to ensure completion of periodic timing calibration within a specified/desired time limit.

Figure 6:
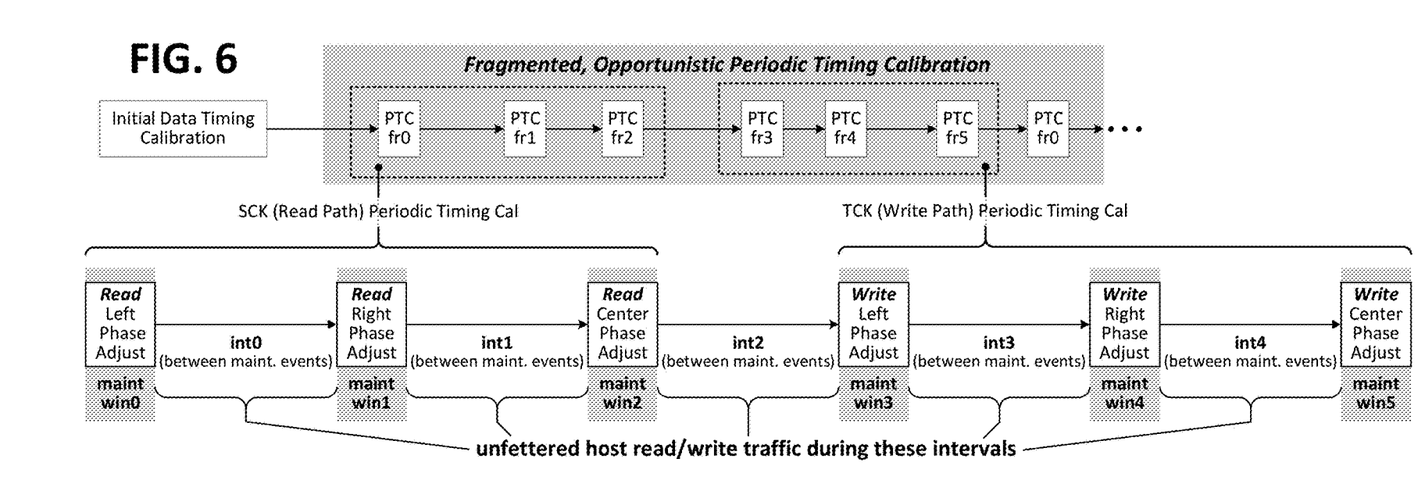
FIG. 6 illustrates a more detailed embodiment of a fragmented periodic timing calibration sequence in which an initial set of three periodic timing calibration fragments are executed during respective maintenance time windows to adjust the left, right and center phases of the read-data sampling clock, and a subsequent set of three periodic timing calibration fragments are executed during respective maintenance time windows to adjust the left, right and center phases of the write data transmit clock.

FIG. 6 illustrates a more detailed embodiment of a fragmented periodic timing calibration sequence in which an initial set of three periodic timing calibration fragments (fr0, fr1, fr2) are executed during respective maintenance time windows (win0, win1, win2) to adjust the left, right and center phases of the read-data sampling clock (SCK), and a subsequent set of three periodic timing calibration fragments (fr3, fr4, fr5) are executed during respective maintenance time windows (win3, win4, win5) to adjust the left, right and center phases of the write data transmit clock (TCK)—sequence repeated round-robin thereafter. The time intervals between maintenance windows (int0, int1, int2, . . . ) may vary in duration and permit unfettered host traffic. Relative durations of maintenance windows and intervening intervals are not shown to scale. In a number of embodiments, for example (and without limitation), the maintenance windows are less than a microsecond (e.g., less than 500, 400, 300, 200 or 100 nanoseconds), while the intervals between maintenance windows are several microseconds, tens of microseconds or hundreds of microseconds (e.g., 1, 50, 100, 200, 500, 1000 or more microseconds).

Figure 7:
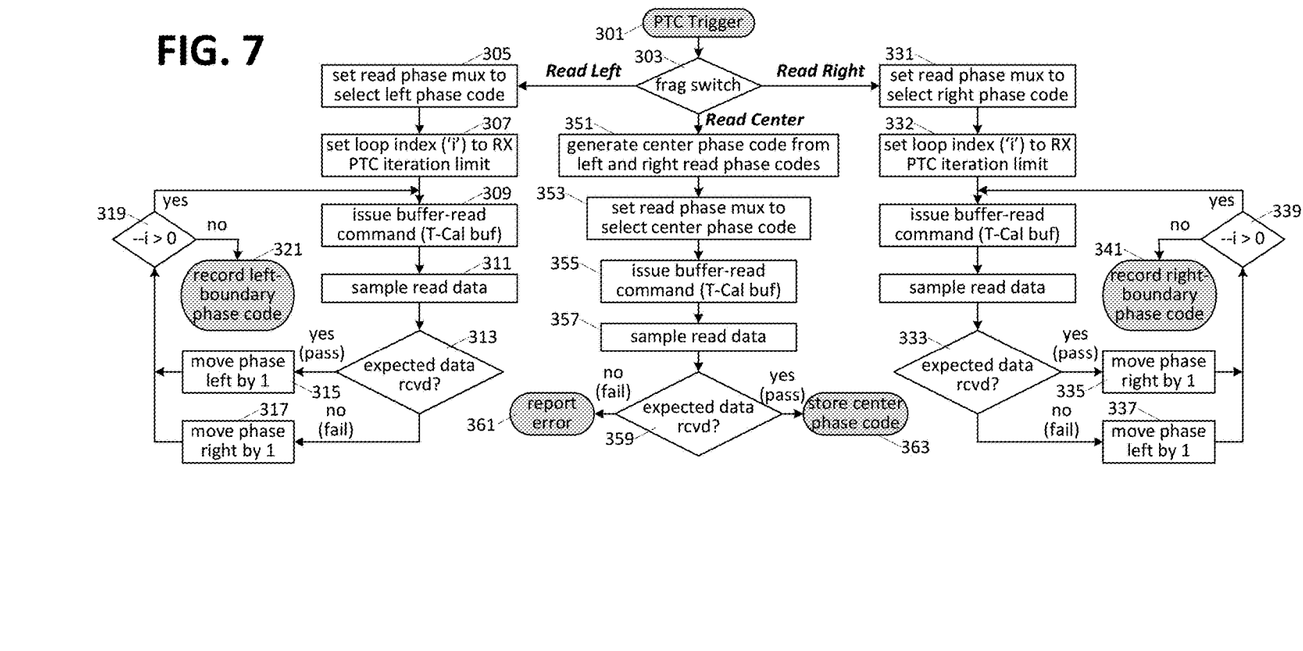
FIG. 7 illustrates exemplary operational sequences for updating left, right and center read-clock phases in respective periodic timing calibration fragments.

FIG. 7 illustrates exemplary operational sequences for updating left, right and center read-clock phases in respective periodic timing calibration fragments. Each fragment execution is initiated in response to a periodic timing calibration trigger (i.e., determination at 301 that a traffic-blocking maintenance operation has or will imminently commence), with switch operation (303) initiating either a left, right or center phase read-timing calibration in response to respective trigger events (e.g., three trigger events required to complete all three data-read periodic timing calibration fragments). In the left-boundary periodic read-timing calibration fragment ("read left"), timing calibration logic within the control component (e.g., element 127 in FIG. 1) sets the read phase mux (e.g., as shown in FIG. 4) to select the left phase code at 305, thereby shifting the phase of the sampling clock signal to the most recently recorded leftmost (earliest) phase point previously determined to yield a passing (data matching) read-data calibration result. At 307, a loop index is initialized to the iteration limit (i.e., for receive timing calibration) to control the number of read-timing calibration iterations to follow. At 309, the control component issues a read-training command to the memory component, instructing (and thus causing) the memory component to transmit, via the DQ link(s), a training data burst retrieved from the timing calibration buffer (the buffer having been left with known data following execution of a prior periodic timing calibration fragment or an initial timing calibration sequence, whichever was most recently executed). The control component samples the transmitted training data with the left-boundary clock phase at 311 and compares the sampled data with a stored or generated instance of the data expected. If expected data has been received (sampled data matches locally stored/generated data and thus affirmative determination at 313), the sampling clock phase under evaluation is deemed to be on the passing or right side of the fail-to-pass boundary (i.e., "pass") and therefore moved by one phase step to the left at 315 (i.e., phase code decremented to advance the sampling clock phase) to seek the edge of the fail-to-pass boundary. If expected data is not received (mismatch between sampled and stored/generated data and thus negative determination at 313), the sampling clock phase under test is deemed to be on the failing or left side of the fail-to-pass boundary (i.e., "fail") and thus moved by one phase step to the right at 317 (i.e., phase code incremented to delay the sampling clock phase) to seek the passing side of the fail-to-pass boundary. After the phase step (phase adjust) at 315 or 317 (as the case may be), the loop index is decremented ("--i") and checked against the iteration limit at 319. If the loop index has not reached the iteration limit (e.g., loop index>0 in this countdown example, and thus affirmative determination at 319), the read-timing phase adjust loop in operations 309, 311, 313, 315/317 is repeated, again advancing or delaying the sampling clock phase according to whether expected data is received. Upon reaching the loop iteration limit (i.e., negative determination at 319), the timing calibration logic records, as the left-boundary sampling clock phase code, the phase code for the leftmost (earliest) sampling clock phase that yielded a passing result (321). In an embodiment where contents of the phase code registers are incremented and decremented in place (e.g., registers shown in FIG. 4 implemented by up/down counters), recording the phase code at 321 may include incrementing the left-boundary phase register content by one phase step if the last loop execution failed to capture expected data and leaving the left-boundary phase register unchanged (i.e., no action) if the last loop execution captured expected data. In any case, the timing calibration logic sets the read phase mux to select the center phase code to conclude the fragment execution and thus make ready for live read-data sampling in the intervening time between fragment execution opportunities.

Still referring to FIG. 7, the right-boundary periodic read-timing calibration fragment ("read right") execution is generally the same as the read left fragment execution, except that the phase mux is set to select the right-boundary phase code at 331, a passing data evaluation at 333 triggers a phase delay at 335 (move right by one on phase step) instead of a phase advance and a failing data evaluation at 333 conversely triggers a phase advance at 337 (move left by one phase step) instead of a phase delay. Upon reaching the loop iteration limit (negative determination at 339), the timing calibration logic records (as the right-boundary sampling clock phase code) the phase code for the right most (latest) sampling clock phase that yielded a passing result at 341 and then resets the read phase mux to select the center (operational) phase code.

In a number of embodiments, after completion of the read-left and read-right periodic read-timing calibration fragments (which may be executed in any order), periodic read-timing calibration is completed by executing, as a final timing calibration fragment, a center-phase set and confirm sequence. Referring to FIG. 7, the "read center" fragment commences at 351 with determination of a center phase code based on the left and right sampling clock phase codes (e.g., through numeric-average calculation, heuristic generation, etc.) followed by storage of the center-phase code within the center phase-code register (e.g., element 225 of FIG. 4). At 353, the timing calibration logic configures the read phase multiplexer (if necessary) to select the center phase code, and then the control component issues a read-training command to the memory component at 355 to trigger memory-side training data retrieval (i.e., from the timing calibration buffer) and transmission. The control component samples the training data transmission at 357, compares the sampled data with expected data, reporting an error to the controller core at 361 if expected data is not received (negative determination at 359) and otherwise records the center phase code (if not already stored) at 363.

A number of the operations shown in FIG. 7 with respect to the left, right and/or center calibration fragments may be omitted or revised in alternative embodiments, particularly with regard to specific circuit implementations. For example, phase code recordation operations at 321, 341 and 363 may be omitted if the phase codes are implemented in place (e.g., incrementing or decrementing contents of up/down counter implementations of registers 221, 223 and 225 shown in FIG. 4). Further, phase codes corresponding to the last known fail (rather than pass) may be recorded for the left and right boundary phases, and/or the last-recorded phase code for the left/right boundary phases may be shifted prior to the read-training data evaluation on expectation that the last-recorded value corresponds to a passing result or failing result. In the case of the read-center fragment, the center phase code may be determined outside the fragment execution interval—e.g., in the background during live traffic transmission to reduce center fragment execution time and/or possibly permit iterative execution (or additional iterations) of the confirmation operations shown at 355, 357 and 359. In yet other embodiments, the confirmation operations shown at 355, 357 and 359 may be omitted altogether—for example, assuming (rather than confirming) an accurate mid-phase adjustment at 351 based on the limited adjustments in the left and right fragments.

Referring to both FIGS. 6 and 7, maintenance time windows (win0, win1, win2, . . . ) are allocated to complete other maintenance operations required by the system, and timing-calibration fragment execution (e.g., operational sequence following fragment switch 303 in FIG. 7) is generally scheduled concurrently (e.g., triggered by commencement of) the maintenance event so as to impose no additional system overhead. In one embodiment, for instance, approximately 110 ns is allocated (required) to refresh all banks within the memory core—an operation that must be executed approximately once per millisecond (e.g., to provide completion of yet another maintenance operation)—and the time required to execute an evaluation loop within the read-left or read-right read timing calibration operations varies between approximately 15 ns to 33 ns depending on system read data latency. Accordingly, given a deterministic ~30 ns time consumption for fragment setup/close operations (i.e., fixed one-time overhead 'K', outside the loop execution time), then the number of loop iterations within the 110 nS timing window may range between 2 for a high-latency system or configuration and 5 for a low-latency system/configuration. More generally, given a latency-dependent loop-execution time (X) within a given read or write timing calibration fragment and a maintenance operation timing budget (Y), then the iteration limit (N) for a given timing fragment may be set to N=int ((Y−K)/X), where 'int( )' represents integer truncation. Further, even if the timing budget permits multiple loop iterations (N>1), a lower iteration limit (e.g., iteration limit=1) may be implemented or programmed within a given system or system configuration.

Figure 8:
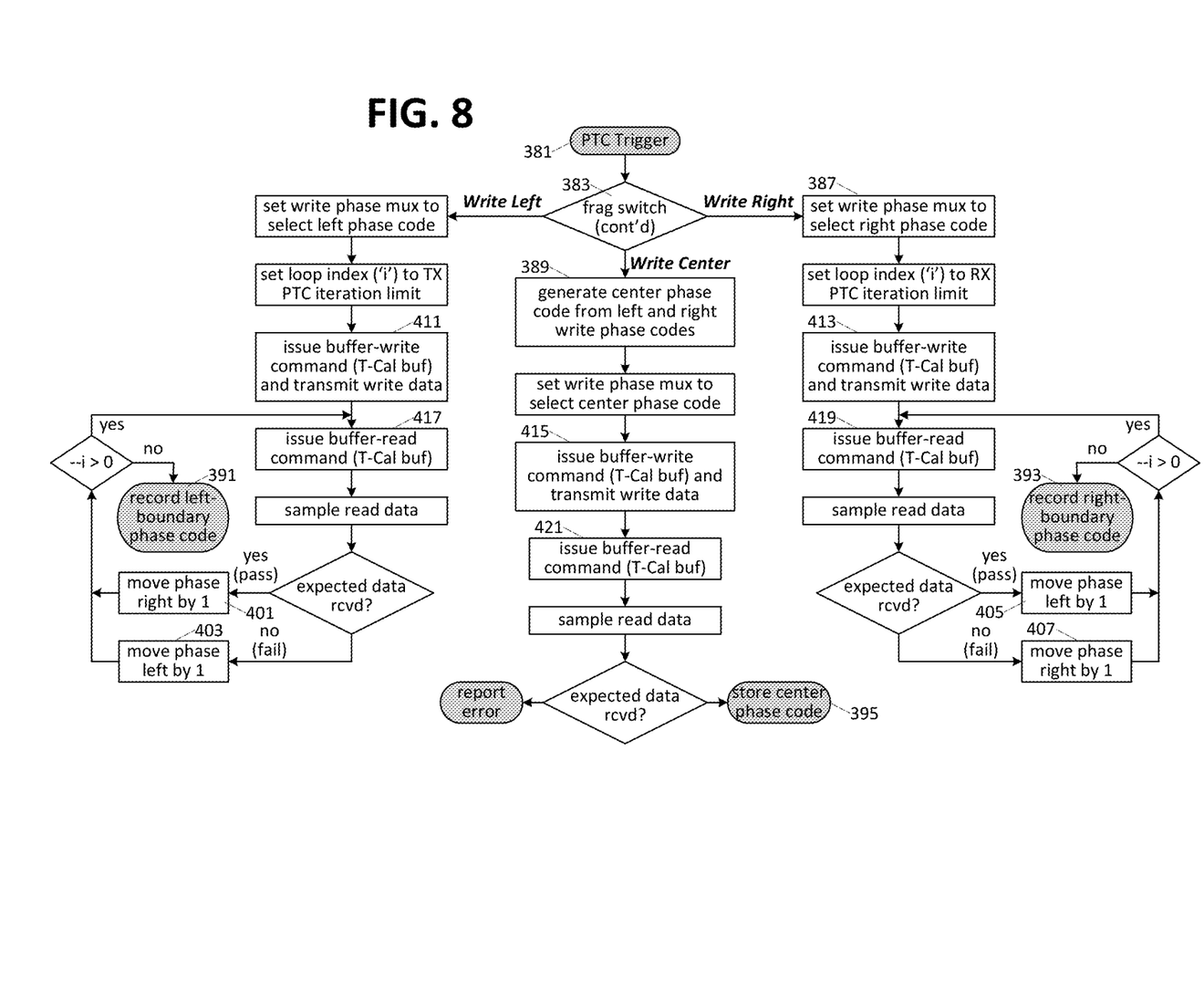
FIG. 8 illustrates exemplary operational sequences for updating left, right and center transmit-clock phases in respective periodic write-timing calibration fragments.

FIG. 8 illustrates exemplary operational sequences for updating left, right and center transmit-clock phases in respective periodic write-timing calibration fragments. As in read timing calibration, each fragment execution is initiated in response to a periodic timing calibration trigger at 381 (i.e., determination that a traffic-blocking maintenance operation has or will imminently commence), with switch operation 383 initiating either a left, right or center phase write-timing calibration in response to respective trigger events (e.g., three trigger events required to complete all three data-write periodic timing calibration fragments)—note that switch operation 383 may be implemented by additional branches at switch operation 303 in FIG. 7. The left, right and center write-timing calibration fragments generally match those for read-timing in FIG. 7, except that the phase code selection operations (385, 387), center phase code generation (389), phase code storage 391, 393, 395 and phase code increment/decrement operations 401/403 and 405/407 are directed to transmit-clock phase registers and multiplexer (instead of sampling clock counterparts). Also, the training operations within the write-left and write-right calibration fragments and the confirm operation within the write-center fragment each include issuance of a buffer-write command and accompanying training data transmission (411, 413, 415), the buffer-write command instructing/causing the memory component to sample the incoming training data and store the sampled result in the timing-calibration buffer for subsequent training data read-out (e.g., in response to commands 417, 419, 421). Further, because the write-training shifts the phase of the control-side transmit clock and thus, from the perspective of the memory component, adjusts the phase of the incoming write-training data, the phase adjustments in the pass/fail cases at 401/403 (write-left) and 405/407 (write right) are opposite those in the counterpart pass/fail cases for read-training (i.e., fail-to-pass and pass-to-fail boundaries refer to the relation between $DCK_M$ and the incoming write data eye as perceived by the memory component—fail-to-pass and pass-to-fail boundaries from the control component perspective are the reverse of those within the memory component such that the phase adjustments shown for write-left and write-right fragments would be reversed). In alternative embodiments, a memory-side sampling clock may be phase shifted during write timing calibration and/or a memory-side transmit clock may be phase shifted during read timing calibration.

The various circuits and component architectures disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, bandwidth ratios, clock ratios, signaling protocols and the like can be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be driven with single-ended or differential signals. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a memory control component, the method comprising:
    calculating first, second, and third phase codes during respective first, second, and third phase code time intervals, wherein the first, second, and third phase codes are configured to control phases of a sampling clock signal, wherein the first phase code time interval is configured to compute a read left phase adjustment of the sampling clock signal, wherein the second phase code time interval is configured to compute a read right phase adjustment of the sampling clock signal, wherein the third phase code is configured to control a read center phase adjustment of the sampling clock signal; and
    outputting unfettered host read commands or unfettered host write commands during first, second, third, and fourth access periods, wherein:
    the read center phase adjustment is calculated in the third phase code time interval, the left phase adjustment is not calculated in the third phase code time interval, and the right phase code is not calculated in the third phase code time interval,
    the third access period occurs before the third phase code time interval and the fourth access period occurs after the third phase code time interval,
    the read left phase adjustment is not calculated between the third access period and the third phase code time interval, and the read right phase code is not calculated between the third access period and the third phase code time interval,
    the read left phase adjustment is not calculated between the third phase code time interval and the fourth access period, and the read right phase code is not calculated between the third phase code time interval and the fourth access period.

2. The method of claim 1, wherein calculating the first and second phase codes during respective first and second phase code time intervals comprises adjusting the first phase code during the first phase code time interval to generate an updated version of the first phase code, and adjusting the second phase code during the second phase code time interval to generate an updated version of the second phase code, and wherein adjusting the third phase code during the third phase code time interval comprises generating an updated version of the third phase code based on the updated versions of the first and second phase codes.

3. The method of claim 2, wherein generating the updated version of the third phase code comprises generating the updated version of the third phase code arithmetically from the updated versions of the first and second phase codes.

4. The method of claim 3, wherein generating the updated version of the third phase code arithmetically from the updated versions of the first and second phase codes comprises averaging the updated versions of the first and second phase codes to obtain the updated version of the third phase code.

5. The method of claim 1, wherein outputting one or more unfettered host read commands or unfettered host write commands at times indicated by a third instance of the sampling clock signal computed during a third phase code interval during a fourth access period such that the phase of the third instance of the sampling clock during the fourth access period is different from the first and second instances of the sampling clock signal computed during the first and second phase code intervals.

6. The method of claim 1, wherein reading host data during the third and fourth access periods comprises reading a signal waveform within a data signal receiver of the memory control component, and wherein adjusting the first and second phase codes during respective first and second phase code time intervals comprises adjusting the first and second phase codes to more closely align the phases of the first and second instances of the sampling clock signal with respective bounding edges of a data valid interval within the signal waveform.

7. The method of claim 6, wherein adjusting the third phase code based on the first and second phase codes as adjusted during the first and second phase code time intervals comprises adjusting the third phase code to more accurately center the phase of the third instance of the sampling clock signal between the bounding edges of the data valid interval.

8. The method of claim 1, wherein the first, second and third phase code time intervals comprises time intervals during which a periodic maintenance operation is executed within the memory component.

9. The method of claim 8 wherein the periodic maintenance operation comprises a dynamic random access memory cell refresh operation.

10. A memory control component comprising:
a command interface to output one or more unfettered host read commands to a memory component:
during a first access period that transpires before the first phase code time interval;
during a second access period that transpires after the first phase code time interval;
during a third access period that transpires after the second phase code time interval;
during a fourth access period that transpires after a third phase code time interval;
reading circuitry to read read-host data:
during first, second, and third phase code time intervals at times indicated by a first instance of a sampling clock signal, the first instance of the sampling clock signal having a phase according to a first phase code and the read-host data being output from the memory component in response to the one or more unfettered host read commands;
during the second access period at times indicated by the sampling clock signal computed in the first phase code time interval;
during the third access period at times indicated by the sampling clock signal computed in the first and second phase code time intervals;
during the fourth access period at times indicated by the sampling clock signal computed in the first, second, and third phase code time intervals, wherein the first phase code time interval is followed by the second access period, which is followed by the second phase code time interval, which is followed by the third access period, which is followed by the third phase code interval, which is followed by the fourth access period; and
clock-phase adjustment circuitry to:
calculate adjustments for first, second, and third phase codes during respective first, second, and third phase code time intervals, the first, second, and third phase codes controlling phases of a sampling clock signal,
wherein the first phase code time interval computes a read left phase adjustment of the sampling clock signal, such that the read left phase adjustment is not calculated between the third access period and the third phase code time interval, and the read right phase code is not calculated between the third access period and the third phase code time interval,
wherein the second phase code time interval computes a read right phase adjustment of the sampling clock signal, such that the read right phase adjustment is not calculated between the third phase code time interval and the fourth access period, and the read left phase code is not calculated between the third phase code time interval and the fourth access period, and
wherein the third phase code time interval computes a read center phase adjustment of the sampling clock signal, such that the left phase adjustment is not calculated in the third phase code time interval, and the right phase code is not calculated in the third phase code time interval.

11. The memory control component of claim 10, wherein calculating the first and second phase codes during respective first and second phase code time intervals comprises adjusting the first phase code during the first phase code time interval to generate an updated version of the first phase code, and adjusting the second phase code during the second phase code time interval to generate an updated version of the second phase code, and wherein adjusting the third phase code during the third phase code time interval comprises generating an updated version of the third phase code based on the updated versions of the first and second phase codes.

12. The memory control component of claim 11, wherein generating the updated version of the third phase code comprises generating the updated version of the third phase code arithmetically from the updated versions of the first and second phase codes.

13. The memory control component of claim 12, wherein generating the updated version of the third phase code arithmetically from the updated versions of the first and second phase codes comprises averaging the updated versions of the first and second phase codes to obtain the updated version of the third phase code.

14. The memory control component of claim 10, wherein outputting one or more unfettered host read commands or unfettered host write commands at times indicated by a third instance of the sampling clock signal computed during a third phase code interval during a fourth access period such that the phase of the third instance of the sampling clock during the fourth access period is different from the first and second instances of the sampling clock signal computed during the first and second phase code intervals.

15. The memory control component of claim 10, wherein reading host data during the third and fourth access time intervals comprises reading a signal waveform within a data signal receiver of the memory control component, and wherein adjusting the first and second phase codes during respective first and second phase code time intervals comprises adjusting the first and second phase codes to more closely align the phases of the first and second instances of the sampling clock signal with respective bounding edges of a data valid interval within the signal waveform.

16. The memory control component of claim 15, wherein adjusting the third phase code based on the first and second phase codes as adjusted during the first and second phase code time intervals comprises adjusting the third phase code to more accurately center the phase of the third instance of the sampling clock signal between the bounding edges of the data valid interval.

17. The memory control component of claim 10, wherein the first, second and third phase code time intervals comprises time intervals during which a periodic maintenance operation is executed within the memory component.

18. A synchronous memory system containing a memory control component including a control component and a memory component, the memory system comprising:
a command interface to output one or more unfettered host read commands to a memory component during first, second, and third phase code time intervals;
reading circuitry to read read-host data:
during the first, second, and third phase code time intervals at times indicated by a first instance of a sampling clock signal, the first instance of the sampling clock signal having a phase according to a first phase code and the read data being output from the memory component in response to the one or more unfettered host read commands; and clock-phase adjustment circuitry to:

calculate adjustments for first, second, and third phase codes during respective first, second, and third phase code time intervals, the first, second, and third phase codes controlling phases of a sampling clock signal, wherein the first phase code time interval computes a read left phase adjustment of the sampling clock signal, such that the read left phase adjustment is not calculated between the third access period and the third phase code time interval, and the read right phase code is not calculated between the third access period and the third phase code time interval, wherein the second phase code time interval computes a read right phase adjustment of the sampling clock signal, such that the read right phase adjustment is not calculated between the third phase code time interval and the fourth access period, and the read left phase code is not calculated between the third phase code time interval and the fourth access period, and wherein the third phase code time interval computes a read center phase adjustment of the sampling clock signal, such that the left phase adjustment is not calculated in the third phase code time interval, and the right phase code is not calculated in the third phase code time interval.

* * * * *